United States Patent
Tolentino et al.

(10) Patent No.: US 9,621,421 B1
(45) Date of Patent: Apr. 11, 2017

(54) SYSTEMS AND METHODS FOR PROGNOSTIC NETWORK MANAGEMENT

(71) Applicant: Juniper Networks, Inc., Sunnyvale, CA (US)

(72) Inventors: Elmer Tolentino, Livermore, CA (US); Graham S Pritchard, Mountain View, CA (US); Steven Keck, Mountain View, CA (US); Jayesh Champaneri, Los Gatos, CA (US); Dharini Hiremagalur, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/320,619

(22) Filed: Jun. 30, 2014

(51) Int. Cl.
*G06F 15/16* (2006.01)
*H04L 12/24* (2006.01)
*G06F 11/34* (2006.01)
*G06F 11/07* (2006.01)
*H04L 12/26* (2006.01)

(52) U.S. Cl.
CPC ...... *H04L 41/0816* (2013.01); *G06F 11/0754* (2013.01); *G06F 11/3409* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 2002/0121910 A1* | 9/2002 | Rome | G01R 31/2829 324/718 |
| 2002/0143421 A1* | 10/2002 | Wetzer | G06Q 10/06 700/100 |
| 2008/0141072 A1* | 6/2008 | Kalgren | G01D 3/08 714/33 |
| 2009/0323517 A1* | 12/2009 | Elam | H04L 43/0811 370/218 |
| 2012/0028670 A1* | 2/2012 | Lim | H04W 52/0261 455/522 |
| 2014/0278711 A1* | 9/2014 | Fuller | G06Q 10/06315 705/7.25 |

(Continued)

OTHER PUBLICATIONS

Eswaran Srinivasan, et al; Systems and Methods for Mitigating Network Congestion; U.S. Appl. No. 14/146,864, filed Jan. 3, 2014.

(Continued)

*Primary Examiner* — Thomas Dailey
(74) *Attorney, Agent, or Firm* — FisherBroyles, LLP

(57) ABSTRACT

A computer-implemented method for prognostic network management may include (1) monitoring a health indicator of a physical component of a device in a network, (2) using the health indicator to estimate a remaining useful life of the physical component, (3) detecting that the remaining useful life of the physical component has reached a predetermined threshold, and (4) reconfiguring the network in response to detecting that the remaining useful life of the physical component has reached the predetermined threshold so that failure of the physical component does not cause the network to become unavailable to any user of the network. Various other methods, systems, and computer-readable media are also disclosed.

20 Claims, 8 Drawing Sheets

(56) References Cited

U.S. PATENT DOCUMENTS

2015/0160098 A1* 6/2015 Noda .................. G05B 23/024
   702/35

OTHER PUBLICATIONS

Ivica D. Bogdanovic, et al; Systems and Methods for Managing Access to Services Provided by Wireline Service Providers; U.S. Appl. No. 14/229,781, filed Mar. 28, 2014.
Rahul Kulkarni, et al; System, Method, and Apparatus for Detecting Fault Conditions Experienced by Remote Physical Ports; U.S. Appl. No. 14/265,321, filed Apr. 29, 2014.
Raveendra Torv, et al; System and Method for Verifying the Functionality of Network Paths; U.S. Appl. No. 14/328,669, filed Jul. 10, 2014.
"Understanding the SNMP Implementation in JUNOS Software", https://www.juniper.net/techpubs/software/junos-security/junos-security10.2/mib-srx3400-srx3600-service-gateway/topic-21511.html, as accessed Jun. 3, 2014, Juniper Networks, Inc., (1999).
Medjaher, K. et al., "Remaining Useful Life Estimation of Critical Components With Application to Bearings", http://ieeexplore.ieee.org/xpl/articleDetails.jsp?arnumber=6190764, as accessed Jun. 3, 2014, IEEE Transactions on Reliability, vol. 61, Issue 2, IEEE, (Apr. 26, 2012), pp. 292-302.
Greg Sidebottom, et al.; Systems and Methods for Virtualizing Customer-Premises Equipment; U.S. Appl. No. 14/226,792, filed Mar. 26, 2014.
Elmer Tolentino, et al; Systems and Methods for Prognostic Network Management; U.S. Appl. No. 15/447,043; Filed Mar. 1, 2017.

\* cited by examiner

Notification
600

Laser is approaching End-of-Life. Pro-active replacement of transceiver is suggested.

| | |
|---|---|
| Physical interface: | so-4/0/0 |
| Laser bias current: | 85.500 mA |
| Laser bias current (BOL): | 71.234 mA |
| Laser output power: | 1.592 mW / 2.02 dBm |
| Receiver signal average optical power: | 1.3854 mW / 1.42 dBm |
| Laser end-of-life alarm: | On |
| Laser wavelength alarm: | Off |
| Laser bias current alarm: | On |
| Laser temperature alarm: | Off |
| Laser power alarm: | Off |
| Modulator temperature alarm: | Off |
| Modulator bias alarm: | Off |
| Tx multiplexer FIFO error alarm: | Off |
| Tx loss of PLL lock alarm: | Off |
| Rx loss of average optical power alarm: | Off |
| Rx loss of AC power alarm: | Off |
| Rx loss of PLL lock alarm: | Off |

*FIG. 6*

```
                                    Notification
                                        700
---------------------------------------------------------------------------
*********************************************

Laser is approaching End-of-Life. Pro-active replacement of transceiver is suggested.

Intermediary report:
Laser end-of-life alarm triggered:      10/17/2012.
Laser bias current EOL 0 days:          85.500 mA
Laser bias current EOL 10 days:         86.500 mA
Laser bias current EOL 20 days:         87.500 mA
// repeat every 10 days until laser is replaced //

Physical interface:                     so-4/0/0
Laser bias current:                     87.500 mA
Laser bias current (BOL):               71.234 mA
Laser output power:                     1.592 mW / 2.02 dBm
Receiver signal average optical power:  1.3854 mW / 1.42 dBm
Laser end-of-life alarm:                On
Laser wavelength alarm:                 Off
Laser bias current alarm:               On
Laser temperature alarm:                Off
Laser power alarm:                      Off
Modulator temperature alarm:            Off
Modulator bias alarm:                   Off
Tx multiplexer FIFO error alarm:        Off
Tx loss of PLL lock alarm:              Off
Rx loss of average optical power alarm: Off
Rx loss of AC power alarm:              Off
Rx loss of PLL lock alarm:              Off

SYSTEMS AND METHODS FOR PROGNOSTIC NETWORK MANAGEMENT

BACKGROUND

Certain network devices, such as network gateways, routers, and switches, are intended to provide networking services continually without interruption. Such network devices are typically made up of one or more physical components (e.g., optical transceivers, fans, and power supplies) that have limited and varying useful lives.

In some situations, a network device and/or the networking services that it provides may fail or otherwise experience downtime if any of the network device's physical components fail. In other circumstances, a network device and/or the networking services that it provides may need to be taken offline in order to repair or replace a physical component of the network device that has failed or is failing. As a result, users of network devices and the networking services that they provide may experience unexpected networking service downtime or unavailability as a result of physical-component failures. As such, the instant disclosure identifies and addresses a need for improved systems and methods for managing and avoiding the effects of physical-component failures.

SUMMARY

As will be described in greater detail below, the instant disclosure generally relates to systems and methods for prognostic network management. In one example, a computer-implemented method for prognostic network management may include (1) monitoring a health indicator of a physical component of a device in a network, (2) using the health indicator to estimate a remaining useful life of the physical component, (3) detecting that the remaining useful life of the physical component has reached a predetermined threshold, and (4) reconfiguring the network in response to detecting that the remaining useful life of the physical component has reached the predetermined threshold so that failure of the physical component does not cause the network to become unavailable to any user of the network.

Similarly, a system incorporating the above-described method may include (1) a monitoring module, stored in memory, that monitors at least one health indicator of a physical component of a device in a network, (2) an estimating module, stored in memory, that uses the health indicator to estimate a remaining useful life of the physical component, (3) a detecting module, stored in memory, that detects that the remaining useful life of the physical component has reached a predetermined threshold, (4) a reconfiguring module, stored in memory, that reconfigures the network so that failure of the physical component does not cause the network to become unavailable to any user of the network, and (5) at least one physical processor that executes the monitoring module, the estimating module, the detecting module, and the reconfiguring module.

A corresponding non-transitory computer-readable medium may include one or more computer-readable instructions that may, when executed by at least one processor of a computing device, cause the computing device to (1) monitor at least one health indicator of a physical component of a device in a network, (2) use the health indicator to estimate a remaining useful life of the physical component, (3) detect that the remaining useful life of the physical component has reached a predetermined threshold, and (4) reconfigure the network in response to detecting that the remaining useful life of the physical component has reached the predetermined threshold so that failure of the physical component does not cause the network to become unavailable to any user of the network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a flow diagram of an exemplary notification for prognostic network management.

FIG. 7 is a flow diagram of an exemplary notification for prognostic network management.

Figure 1:
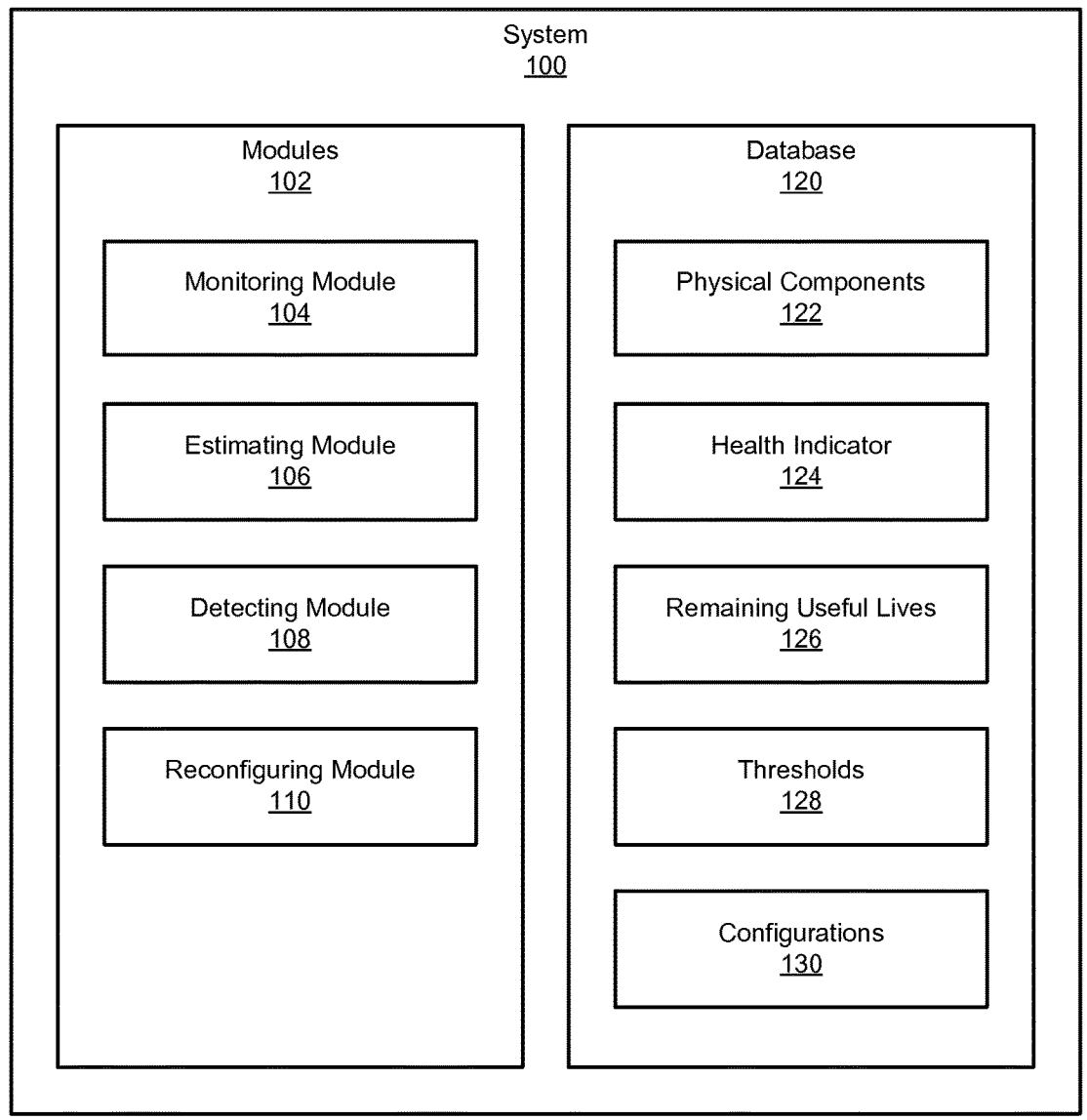
FIG. 1 is a block diagram of an exemplary apparatus for prognostic network management.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for prognostic network management. As will be explained in greater detail below, by determining when a physical component (e.g., an optical transceiver, a fan, or a power supply) of a network device (e.g., a switch or router) is likely to fail, embodiments of the instant disclosure may enable an administrator of a network to proactively reconfigure the network in anticipation of the failure of the physical component, which may reduce unscheduled downtime and improve the availability of the network. For example in anticipation of the failure of a physical component of a device in a network, embodiments of the instant disclosure may enable an administrator of the network to perform proactive maintenance operations on the physical component and/or reconfigure the network in a way that prevents the failure of the physical component from negatively impacting users of the network. In one example, embodiments of the instant disclosure may, in response to detecting the eminent failure of a physical component of a network switch that hosts a user's primary path through a network, reconfigure the network such that the user's traffic is routed through a secondary path through the network before or when the physical component actually fails. Embodiments of the instant disclosure may also provide various other advantages and features, as discussed in greater detail below.

Figure 2:
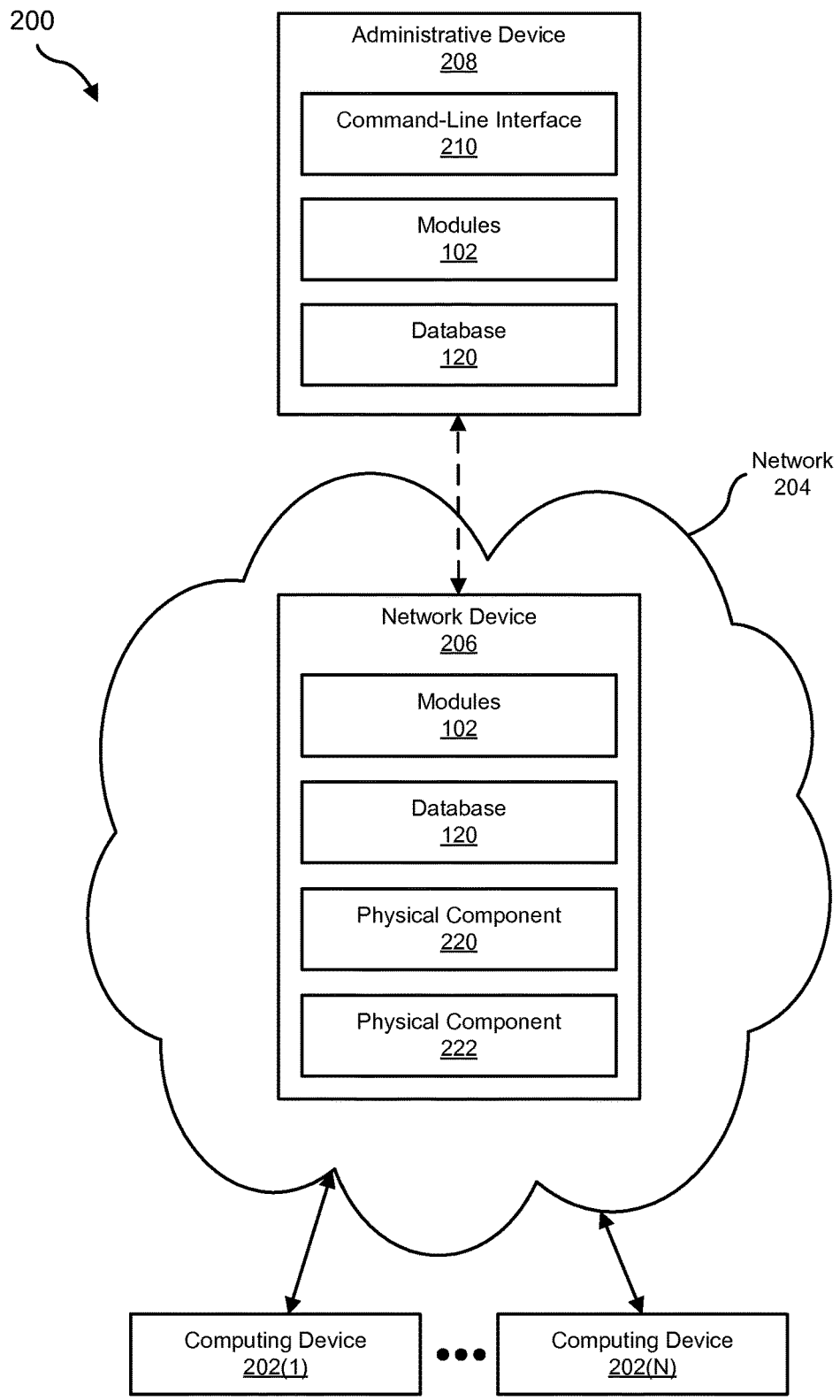
FIG. 2 is a block diagram of an exemplary apparatus for prognostic network management.

The following will provide, with reference to FIGS. 1 and 2 detailed descriptions of exemplary systems for prognostic network management. Detailed descriptions of corresponding computer-implemented methods will also be provided in connection with FIGS. 3-7. In addition, detailed descriptions of an exemplary computing system capable of implementing one or more of the embodiments described herein will be provided in connection with FIG. 8.

FIG. 1 is a block diagram of an exemplary system 100 for prognostic network management. As illustrated in this figure, exemplary system 100 may include one or more modules 102 for performing one or more tasks. For example, and as will be explained in greater detail below, exemplary system 100 may include a monitoring module 104 that monitors at least one health indicator of a physical component of a device in a network. Exemplary system 100 may also include an estimating module 106 that uses the health indicator to estimate a remaining useful life of the physical component.

In addition, and as will be described in greater detail below, exemplary system 100 may include a detecting module 108 that detects that the remaining useful life of the physical component has reached a predetermined threshold. Exemplary system 100 may also include a reconfiguring module 110 that reconfigures the network so that failure of the physical component does not cause the network to become unavailable to any user of the network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., network device 206 and/or administrative device 208) and/or computing system 800 in FIG. 8. In at least one example, modules 102 may represent all or a portion of a Simple Network Management Protocol (SNMP) agent or manager. One or more of modules 102 in FIG. 1 may also represent all or portions of one or more special-purpose computers configured to perform one or more tasks. In at least one example, one or more of modules 102 in FIG. 1 may represent all or portions of a system that manages and/or prevents network failures.

As illustrated in FIG. 1, exemplary system 100 may also include one or more databases, such as database 120. In one example, database 120 may include physical components 122 for storing information about one or more physical components, health indicators 124 for storing information about one or more health indicators, remaining useful lives 126 for storing information about one or more remaining useful lives, thresholds 128 for storing information about one or more predetermined thresholds used to detect when physical components will or will likely fail based on estimated remaining useful lives, and configurations 130 for storing information about one or more network configurations for preventing physical-component failures from causing networks to become unavailable to users of the networks.

Database 120 may represent portions of a single database or computing device or a plurality of databases or computing devices. For example, database 120 may represent a portion of network device 206 and/or administrative device 208 in FIG. 2 and/or computing system 800 in FIG. 8. Alternatively, database 120 in FIG. 1 may represent one or more physically separate devices capable of being accessed by a computing device, such as network device 206 and/or administrative device 208 in FIG. 2 and/or computing system 800 in FIG. 8. In at least one example, database 120 may represent all or portion of a management information base (MIB).

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing devices 202(1)-(N). Network 204 may include a network device 206 that handles at least a portion of traffic exchanged between computing devices 202(1)-(N). In one embodiment, network device 206 may be programmed with one or more of modules 102 and/or may store all or a portion of the data in database 120. Additionally or alternatively, administrative device 208 may be programmed with one or more of modules 102 and/or may store all or a portion of the data in database 120. In at least one example, modules 102 and database 120 may represent all or a portion of a SNMP agent configured to run on network device 206 and/or a SNMP manager configured to run on administrative device 208.

In one embodiment, one or more of modules 102 from FIG. 1 may, when executed by at least one processor of network device 206 and/or administrative device 208, enable network device 206 and/or administrative device 208 to manage and avoid physical-component failures in network 204. For example, and as will be described in greater detail below, one or more of modules 102 may cause network device 206 and/or administrative device 208 to (1) monitor health indicators of physical component 220 and physical component 222 of network device 206 in network 204, (2) use the health indicators to estimate the remaining useful lives of physical component 220 and physical component 222, (3) detect that the remaining useful life of physical component 220 or physical component 222 has reached a predetermined threshold, and (4) reconfigure network 204 (e.g., by reconfiguring network device 206, physical component 220, and/or physical component 222) in response to detecting that the remaining useful life of physical component 220 or physical component 222 has reached the predetermined threshold so that failure of physical component 220 or physical component 222 does not cause network 204 to become unavailable to any user of network 204 (e.g., users of computing devices 202(1)-(N)).

Computing devices 202(1)-(N) generally represent any type or form of computing device capable of reading computer-executable instructions and/or communicating with one another via a network. Examples of computing devices 202(1)-(N) include, without limitation, laptops, tablets, desktops, servers, cellular phones, Personal Digital Assistants (PDAs), multimedia players, gaming systems, embedded systems, exemplary computing system 810 in FIG. 8, portions of one or more of the same, combinations of one or more of the same, or any other suitable computing devices.

Network device 206 generally represents any type or form of computing device capable of handling, routing, and/or forwarding traffic within a network. Examples of network device 206 include, without limitation, routers, switches, network hubs, gateways, network default gateways, nodes, servers, bridges, Field Programmable Gate Arrays (FPGAs), exemplary computing system 810 in FIG. 8, portions of one or more of the same, combinations of one or more of the same, or any other suitable network device.

Administrative device 208 generally represents any type or form of computing and/or display device capable of managing a network and/or providing a command-line interface to a network administrator. Examples of administrative device 208 include, without limitation, laptops, tablets, desktops, servers, monitors, displays, cellular phones, PDAs, multimedia players, gaming systems, embedded systems, exemplary computing system 810 in FIG. 8, portions of one or more of the same, combinations of one or more of the same, or any other suitable administrative device. As shown in FIG. 2, administrative device 208 may provide a command-line interface 210. The term "command-line interface," as used herein, generally refers to any type or form of user interface that facilitates entry of text-based commands directed to configuring, controlling, managing, and/or modifying operation of network devices. In one embodiment, command-line interface 210 may represent a portion of a network operating system (such as JUNIPER NETWORKS' JUNOS, CISCO SYSTEMS' IOS, or ALCATEL-LUCENT'S SR OS). Additionally or alternatively, command-line interface 210 may represent a portion of a network application.

Figure 3:
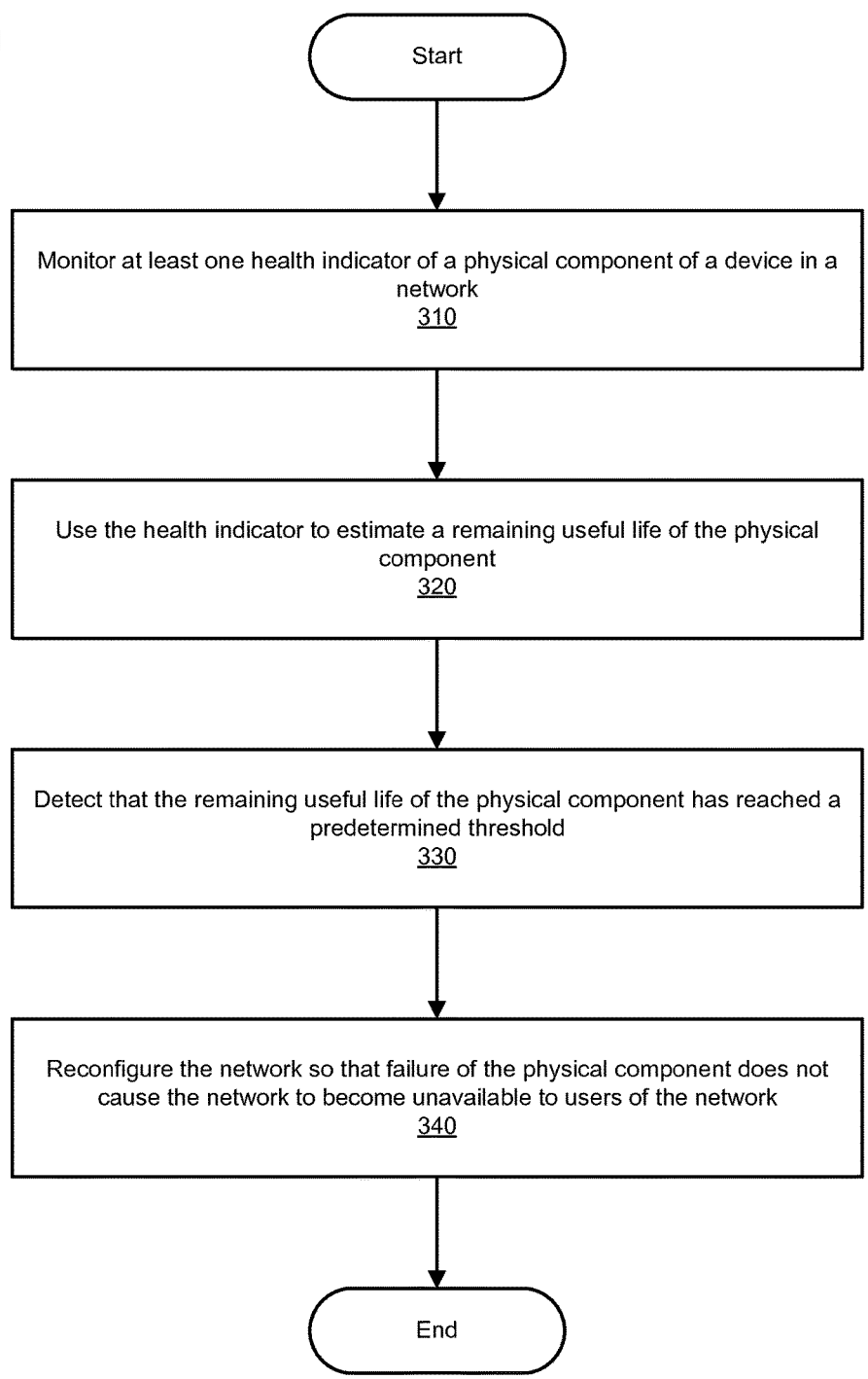
FIG. 3 is a flow diagram of an exemplary method for prognostic network management.
Figure 4:
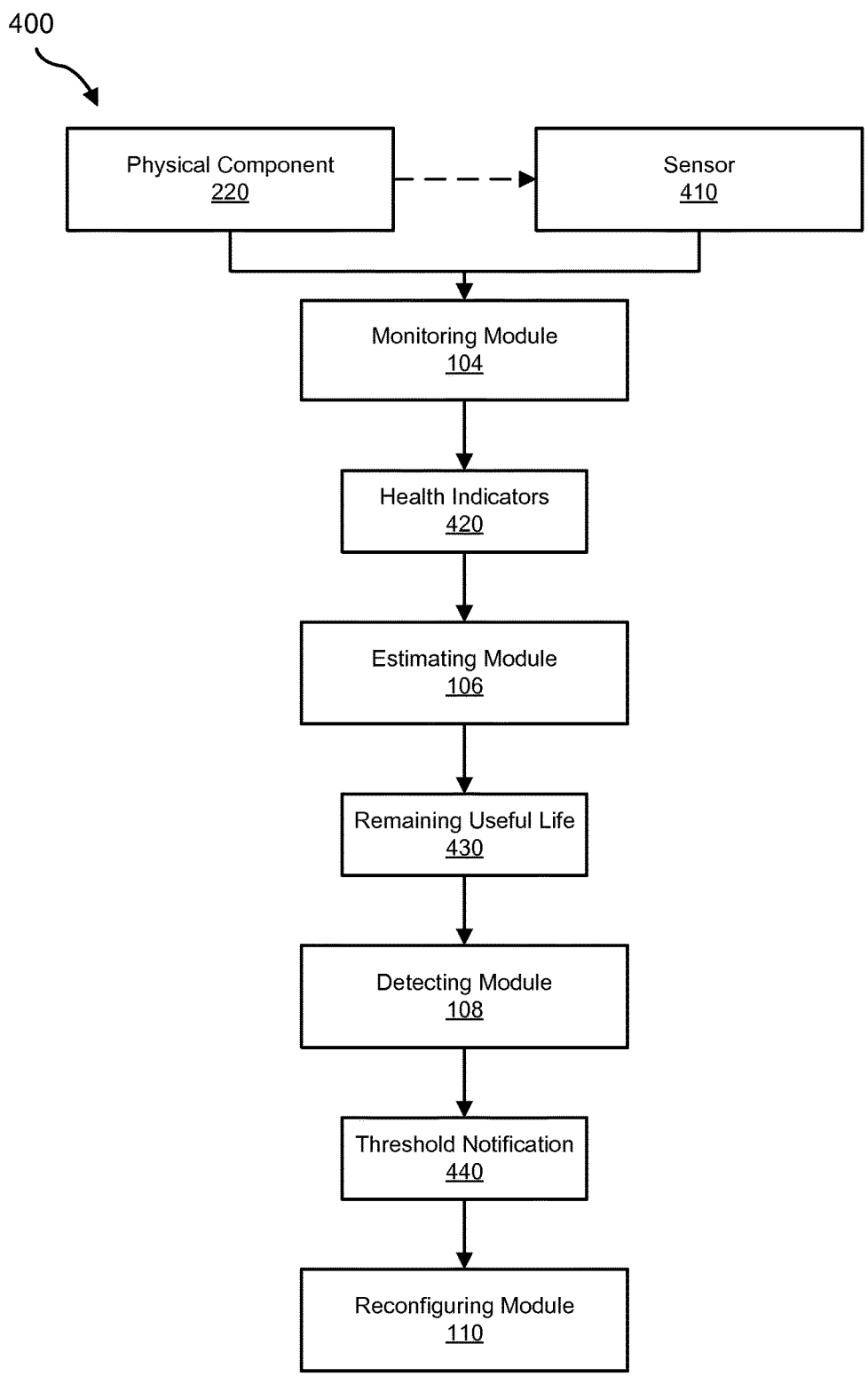
FIG. 4 is a diagram of an exemplary data flow for prognostic network management.

FIG. 3 is a flow diagram of an exemplary computer-implemented method 300 for prognostic network management. The steps shown in FIG. 3 may be performed by any suitable computer-executable code and/or computing system. In some embodiments, the steps shown in FIG. 3 may be performed by one or more of the components of system 100 in FIG. 1, one or more of the components of system 200 in FIG. 2, and/or computing system 800 in FIG. 8.

As illustrated in FIG. 3, at step 310 one or more of the systems described herein may monitor at least one health indicator of a physical component of a device in a network. For example, monitoring module 104 may, as part of network device 206 and/or administrative device 208 in FIG. 2, monitor at least one health indicator of physical component 220 of network device 206.

As used herein, the term "physical component" generally refers to any physical element of an electronic device. Examples of physical components include, without limitation, optical transceivers, fans, fan trays, air filters, batteries, hard disk drives, Solid State Drives (SSDs), hybrid memory cubes (HMC), static random access memory (SRAM), dynamic random access memory (DRAM), Electrically Erasable Programmable Read-Only Memory (EEPROM), flash memory, relays, switches, electrolytic capacitors, power Field-Effect Transistors (FET), power supplies, power converters, microprocessors, microcontrollers, and Application-Specific Integrated Circuit (ASICs). After a period of time or under certain circumstances, many forms of physical components will wear out and/or fail. In some cases, an electronic device may completely or partially fail when a physical component of the electronic device fails. Fortunately, certain properties of some physical components may indicate when the physical components are likely to fail.

The term "health indicator," as used herein, generally refers to any static or dynamic property of a physical component that may be used, alone or in combination, to estimate a remaining useful life of the physical component. Examples of health indicators of a physical component include, without limitation, an age of the physical component, a temperature of the physical component, a speed of the physical component, a current drawn by the physical component, a voltage of the physical component, a failure alarm raised by the physical component, a threshold alarm raised by the physical component, an expected life of the physical component (e.g., a L10 life, a Mean Time To Failure (MTTF), or a Mean Time Between Failures (MTBF)), a failure rate of the physical component, and environmental conditions experienced by the physical component.

Returning to FIG. 3, monitoring module 104 may monitor the health indicators of physical components in a variety of ways. In general, monitoring module 104 may monitor the health indicators of a physical component by collecting and storing information about the health indicators. In some situations, a physical component may be configured to periodically or continually report one or more indicators of its own health. In these situations, monitoring module 104 may monitor the health indicators of such physical components by monitoring the health indicators as they are reported by the physical components. Using FIG. 4 as an example, monitoring module 104 may collect health indicators 420 of physical component 220 by receiving one or more health indicators that are reported by physical component 220.

In some situations, sensors (e.g., thermometers, tachometers, voltage sensors, and current sensors) may be used to collect indicators of a physical component's health. In these situations, monitoring module 104 may monitor health indicators of a physical component by monitoring the health indicators of the physical component as they are reported by these sensors. Using FIG. 4 as an example, monitoring module 104 may collect health indicators 420 of physical component 220 by receiving one or more health indicators that are reported by sensor 410. In this example, sensor 410 may represent a sensor attached or connected to physical component 220 that measures one or more properties of physical component 220.

In some examples, monitoring module 104 may monitor a health indicator of a physical component as part of monitoring the health indicator of a group of related physical components. For example, monitoring module 104 may monitor various steady-state-life reliability health indicators (such as a MTBF or a failure rate) of a group of related physical components (e.g., each instance of a particular type, model, or make of physical component in a single network or each instance of a particular type, model, or make of physical component that is monitored across many networks) by monitoring how each physical component in the group of related physical components wears out or fails over time.

In some embodiments, monitoring module 104 may monitor the health indicators of the physical components of a device as part of a SNMP agent running on the device that monitors, collects, and/or exchanges network management information with a SNMP manager. For example, monitoring module 104 may monitor the health indicators of physical components 220 and 222 of network device 206 as part of a SNMP agent running on network device 206 that monitors, collects, and/or exchanges network management information with a SNMP manager running on administrative device 208. Additionally or alternatively, monitoring module 104 may monitor the health indicators of the physical components of each device in a network as part of a SNMP manager that monitors, collects, and/or exchanges network management information with SNMP agents running on each device in the network. In some examples, monitoring module 104 may use a management information base (MIB) object that represents a physical component to collect and/or access information about the physical component's health indicators.

As illustrated in FIG. 3, at step 320, one or more of the systems described herein may use the health indicator to estimate a remaining useful life of the physical component. For example, estimating module 106 may, as part of network device 206 and/or administrative device 208 in FIG. 2, use the health indicators of physical component 220 identified as part of step 310 to estimate a remaining useful life of physical component 220. Using FIG. 4 as an additional example, estimating module 106 may use health indicators 420 to estimate remaining useful life 430 of physical component 220.

As used herein, the term "remaining useful life" generally refers to any indicator of how long a physical component will operate before failing. In some examples, a remaining useful life may represent a binary indicator of whether failure of a physical component is eminent, a length of time a physical component is likely to operate before failing, a likelihood that the physical component will fail during a particular time period, or a percentage of the remaining expected life of a physical component.

Estimating module 106 may estimate remaining useful lives in a variety of ways. In some examples, estimating module 106 may estimate a remaining useful life of a physical component by comparing the current value of one or more health indicators of the physical component to values, ranges, or thresholds for the health indicators that are correlated with estimated remaining useful lives. In one example, a health indicator (e.g., a temperature, voltage, or current) of a physical component that is more than a particular percentage above or below a normal operating or beginning-of-life (BOL) value may be mapped to a short remaining useful life. Using FIG. 6 as an example, estimating module 106 may determine that an optical transceiver has a short remaining useful life by comparing its current laser bias current (85.500 mA) to its beginning-of-life (BOL) laser bias current (71.234 mA) and by determining that the optical transceiver's current laser bias current is more than twenty percent higher than its BOL laser bias current.

In some examples, a physical component may be configured to generate an alarm at various stages of the physical component's life. For example, a physical component may generate an alarm when the physical component is about to fail. In situations such as these, monitoring module 104 may estimate a remaining useful life of a physical component based on whether the physical component has generated an alarm. Using FIG. 6 as an example, estimating module 106 may determine that an optical transceiver has a short remaining useful life by determining that the optical transceiver has generated an end-of-life (EOL) alarm.

In some examples, estimating module 106 may estimate a remaining useful life of a physical component by comparing its expected life to how long the physical component has been operating. For example, estimating module 106 may estimate a remaining useful life of a physical component by subtracting how long the physical component has been operating from its expected life. In another example, estimating module 106 may estimate a remaining useful life of a physical component by determining what percentage of the physical component's expected life remains.

In some examples, estimating module 106 may determine how a health indicator may have affected the remaining useful life of a physical component by analyzing the health indicator overtime. For example, estimating module 106 may estimate a remaining useful life of a physical component based on whether the health indicator shows signs of instability and/or whether the health indicator shows signs of a rising or decreasing trend that is indicative of a short remaining useful life.

In some examples, estimating module 106 may model how health indicators affect the remaining useful lives of certain physical components. In one example, estimating module 106 may model how thermal stress affects the remaining useful lives of certain physical components. For example, estimating module 106 may use the Arrhenius reaction rate model to determine whether a temperature-based health indicator of a physical component indicates that the remaining useful life of the physical component has been affected by thermal stress.

In some examples, estimating module 106 may analyze multiple health indicators when estimating a remaining useful life of a physical component. When analyzing multiple health indicators, estimating module 106 may estimate a remaining useful life based on whether the health indicators of the physical component point to the same estimated remaining useful life. For example, estimating module 106 may conclude that a fan whose expected life has expired is not about to fail by determining that other health indicators of the fan (e.g., fan speed, current, etc.) are indicative of good health. In at least one example, estimating module 106 may weight the contribution of each health indicator of a physical component when estimating a remaining useful life of the physical component.

In some examples, estimating module 106 may analyze the health indicators of one or more physical components in a group of related physical components (e.g., each instance of a particular type, model, or make of physical component in a single network or each instance of a particular type, model, or make of physical component that is monitored across many networks) to estimate a remaining useful life of some or all of the members of the group of related physical components. For example, estimating module 106 may analyze the health indicators of a group of physical components to determine whether the group of physical components is prematurely wearing out.

In some examples, estimating module 106 may determine whether a group of physical components is prematurely wearing out by (1) identifying an expected or acceptable failure rate or MTBF for the group of physical components (e.g., a value provided by a manufacturer or administrator), (2) calculating an actual failure rate or MTBF for the group of related physical components based on the number of failures that have occurred in the group of related physical components, and (3) determining whether the actual failure rate or MTBF is acceptable based on the expected or acceptable failure rate or MTBF. In some examples if estimating module 106 determines that the actual failure rate or MTBF of a group of related physical components is not acceptable, estimating module 106 may assume that a physical component in the group of related physical components is likely to prematurely wear out when estimating the remaining useful life of the physical component.

In some examples, estimating module 106 may enable an administrator to define the functions that are used to determine the remaining useful lives of certain physical components. For example, estimating module 106 may enable an administrator to define the ranges, thresholds, etc. used to determine whether a health indicator indicates that a physical component is about to fail. By enabling an administrator to define the functions that are used to determine the remaining useful lives of certain physical components, estimating module 106 may enable the administrator to be more or less conservative in managing and preventing physical-component failures.

In some embodiments, estimating module 106 may estimate the remaining useful lives of the physical components of a device as part of a SNMP agent running on the device. Additionally or alternatively, estimating module 106 may estimate the remaining useful lives of the physical components of each device in a network as part of a SNMP manager using health indicators collected from SNMP agents running on each device in the network. In some examples, estimating module 106 may use a management information base (MIB) object that represents a physical component to record and/or access information about the physical component's estimated remaining useful life.

As illustrated in FIG. 3, at step 330 one or more of the systems described herein may detect that the remaining useful life of the physical component has reached a predetermined threshold. For example, detecting module 108 may, as part of network device 206 and/or administrative device 208 in FIG. 2, detect that the remaining useful life of physical component 220 has reached a threshold that indicates that physical component 220 is about to fail.

As will be explained in greater detail below, detecting module 108 may use one or more remaining-useful-life thresholds to define when the system and methods disclosed herein should perform certain actions. In some examples, detecting module 108 may use a remaining-useful-life threshold to cause the system and methods disclosed herein to perform certain actions when the remaining useful life of a physical component indicates that the physical component's health is critical or that failure of the physical component is eminent.

Figure 5:
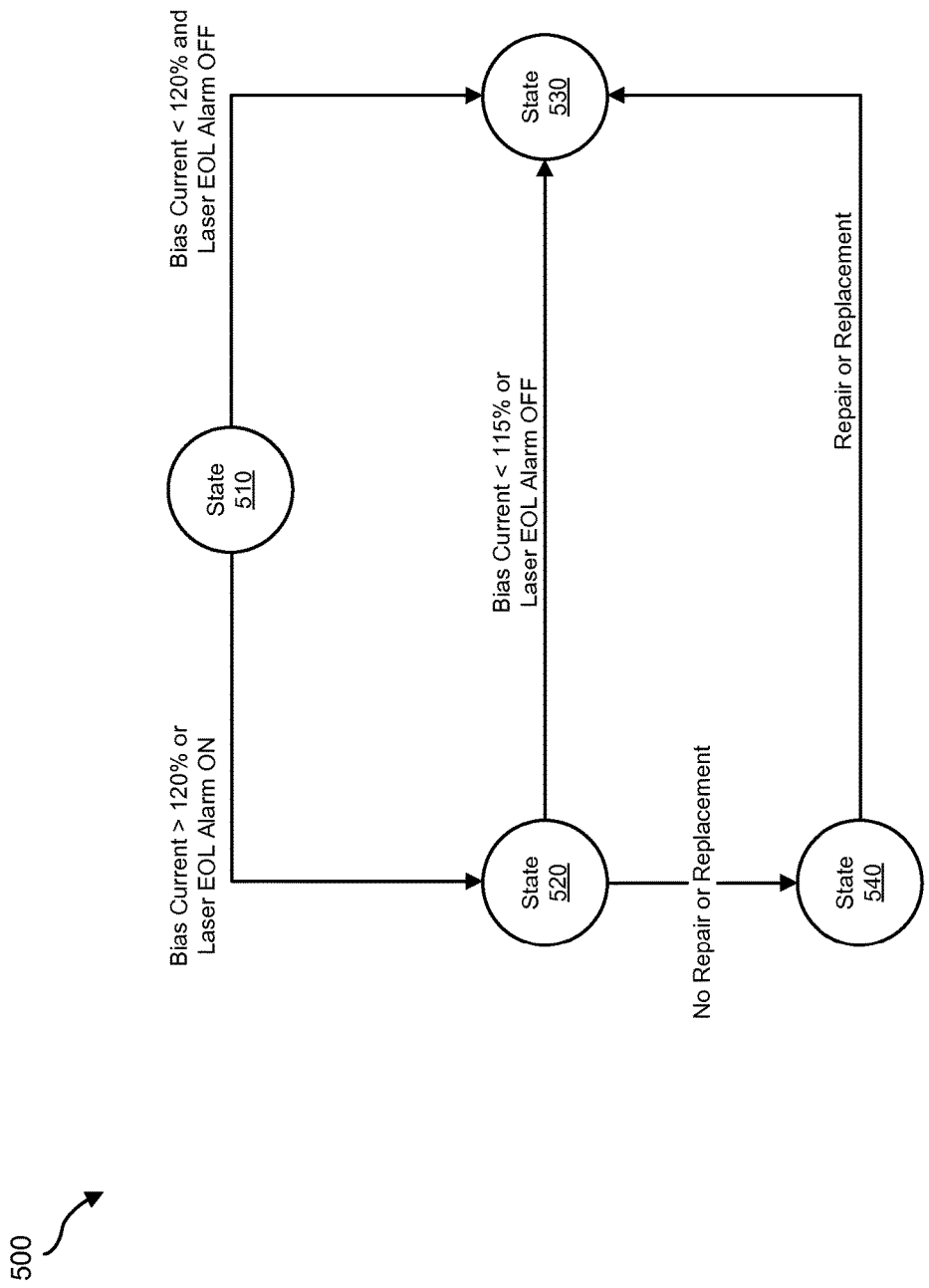
FIG. 5 is a diagram of an exemplary state machine for prognostic network management.

FIG. 5 is a diagram of an exemplary state machine 500 that illustrates various states of the systems and methods disclosed herein. As shown in FIG. 5, exemplary state machine 500 may include a state 510, a state 520, a state 530, and a state 540 with various transitions. In this example and as will be explained in greater detail below, state 510 may represent a state at which detecting module 108 determines whether the remaining useful life of an optical transceiver indicates that the optical transceiver is about to fail, state 520 may represent a state at which reconfiguring module 110 may notify an administrator of the eminent failure of the optical transceiver and/or may reconfigure a network to manage or prevent failure of the optical transceiver, state 530 may represent a state at which reconfiguring module 110 may notify an administrator that the optical transistor is functioning normally and/or may revert the network to a prior configuration after the optical transceiver is repaired or replaced, and state 540 may represent the state at which reconfiguring module 110 may monitor and report the health status of the optical transceiver.

In state 510, detecting module 108 may cause a transition to state 520 in response to detecting that the remaining useful life of the optical transceiver indicates that the optical transceiver is about to fail (e.g., the current bias current of the optical transceiver is greater than 120% of the BOL bias current or (2) the optical transceiver has generated an EOL alarm). Alternatively, detecting module 108 may cause a transition to state 530 in response to detecting that the remaining useful life of the optical transceiver indicates that the optical transceiver is not about to fail (e.g., the current bias current of the optical transceiver is less than 120% of the BOL bias current and the optical transceiver has not generated an EOL alarm). In state 520, detecting module 108 may also cause a transition to state 530 in response to detecting that the remaining useful life of the optical transceiver indicates that the optical transceiver is no longer about to fail (e.g., the current bias current of the optical transceiver is less than 115% of the BOL bias current or the optical transceiver has not generated an EOL alarm).

Returning to FIG. 3, detecting module 108 may trigger an action tied to a threshold in response to detecting that the remaining useful life of a physical component has reached the threshold. Using FIG. 4 as an example, detecting module 108 may generate a threshold notification 440 that may cause reconfiguring module 110 to perform various actions in response to detecting that remaining useful life 430 of physical component 220 has reached a particular threshold.

In at least one example, detecting module 108 may trigger an action tied to a threshold in response to detecting that the remaining useful life of each physical component in a group of related physical components has simultaneously reached the threshold. For example, detecting module 108 may generate a threshold notification that indicates that a possible epidemic failure situation may be occurring within a network in response to detecting that the remaining useful life of each physical component in a group of related physical components in the network has simultaneously reached a threshold that indicates that the group of related physical components are about to fail.

In some examples, detecting module 108 may, as part of a SNMP agent, detect that the remaining useful life of a physical component has reached a predetermined threshold as part of sending SNMP notifications associated with an event that is defined by the predetermined threshold to a SNMP manager. Additionally or alternatively, detecting module 108 may, as part of a SNMP manager, detect that the remaining useful life of a physical component has reached a predetermined threshold by receiving a SNMP notification from an SNMP agent that indicates that that the remaining useful life of a physical component has reached the predetermined threshold.

In some examples, detecting module 108 may use a MIB to record and/or access information about the threshold levels associated with a physical component's estimated remaining useful life. For example, detecting module 108 may use a MIB object to record and/or access one or more threshold levels tied to a physical component's estimated remaining useful life that will trigger SNMP trap notifications. In at least one example, detecting module 108 may enable an administrator of a network to use one or more remaining-useful-life thresholds to define when the system and methods disclosed herein should perform certain actions.

As illustrated in FIG. 3, at step 340 one or more of the systems described herein may reconfigure the network in response to detecting that the remaining useful life of the physical component has reached the predetermined threshold so that failure of the physical component does not cause the network to become unavailable to any user of the network. For example in response to detecting that the remaining useful life of physical component 220 has reached a predetermined threshold, reconfiguring module 110 may, as part of network device 206 and/or administrative device 208 in FIG. 2, reconfigure network 204, network device 206, physical component 220, physical component 222, and/or any other network device or physical component in network 204 so that failure of physical component 220 does not cause network 204 to become unavailable to any user of network 204 (e.g., users of computing devices 202(1)-(N)). Upon completion of step 340, exemplary method 300 in FIG. 3 may terminate.

Reconfiguring module 110 may reconfigure a network in any way such that failure of a physical component does not cause the network to become unavailable to any user of the network for more than an insignificant period of time (e.g., tens of milliseconds). In general, reconfiguring module 110 may prevent the failure of a physical component from causing a network to become unavailable to users of the network by reconfiguring the network so that the physical component or the device within which the physical component exists may be taken offline or fail without causing the network to become unavailable and/or by reconfiguring the network so that failure of the physical component is delayed.

In some instances, a failure of a physical component may cause a user's primary path through a network to become unavailable. For example, failure of a physical component (e.g., an optical transceiver) of a network switch may cause a network to become unavailable to a user connected to the network through a particular port of the network switch. In another example, failure of a physical component (e.g., a power supply) of a network switch may cause a network to become unavailable to a user connected to the network through the network switch. For at least these reasons, reconfiguring module 110 may reconfigure a network so that a physical component or the device within which the physical component exists may be taken offline or fail without causing the network to become unavailable by reconfiguring the network to reroute the user's traffic to a secondary path through the network that does not require the physical component or the device.

In some examples if failure of a physical component of a network switch may cause a network to become unavailable to a user connected to the network through a first port of the network switch, reconfiguring module 110 may prevent the network from becoming unavailable to the user by reconfiguring the network so that the user's traffic is rerouted through a second port of the network switch. Reconfiguring module 110 may reconfigure the network so that the user's traffic is rerouted through a second port of the network switch using any suitable switchover or failover mechanism. For example, reconfiguring module 110 may configure a Link Aggregation Group (LAG) that includes the first and second ports of the network switch. Additionally or alternatively, reconfiguring module 110 may configure the second port to act as a backup to the first port using the fast reroute feature of the Multiprotocol Label Switching (MPLS) protocol. In some examples, reconfiguring module 110 may automatically identify a suitable port of a network switch through which a user's traffic may be routed. Additionally or alternatively, reconfiguring module 110 may guide an administrator through the process of provisioning a suitable port of a network switch through which a user's traffic may be routed.

In some examples if failure of a physical component of a network switch may cause a network to become unavailable to a user connected to the network through the network switch, reconfiguring module 110 may prevent the network from becoming unavailable to the user by reconfiguring the network so that the user's traffic is rerouted through a secondary network switch in the network. Reconfiguring module 110 may reconfigure the network so that the user's traffic is rerouted through a secondary network switch using any suitable switchover or failover mechanism (e.g., a suitable mechanism provided by the Virtual Router Redundancy Protocol (VRRP), the Multiprotocol Label Switching (MPLS) protocol, and/or the Virtual Local Area Network (VLAN) protocol). In at least one example, reconfiguring module 110 may reconfigure a network so that a user's traffic is rerouted through a secondary network switch using a stateful switchover mechanism, such as JUNIPER's GRACEFUL ROUTING ENGINE SWITCHOVER (GRES) or CISCO's STATEFUL SWITCHOVER (SSO). In some examples, reconfiguring module 110 may automatically identify a suitable network switch through which a user's traffic may be routed. Additionally or alternatively, reconfiguring module 110 may guide an administrator through the process of provisioning a suitable network switch through which a user's traffic may be routed.

As mentioned above in some situations, reconfiguring module 110 may prevent the failure of a physical component from causing a network to become unavailable to users of the network by reconfiguring the network so that failure of the physical component is delayed. In some examples, reconfiguring module 110 may reconfigure a network so that failure of the physical component is delayed by causing the device within which the physical component exists to use a redundant physical component in place of the physical component. For example, reconfiguring module 110 may reconfigure a device to use a redundant power supply in place of a failing power supply.

In some examples, reconfiguring module 110 may reconfigure a network so that failure of a physical component is delayed by reconfiguring the network so that the remaining useful life of the physical component is prolonged. Reconfiguring module 110 may prolong the remaining useful life of a physical component in a variety of ways. In one example, reconfiguring module 110 may prolong the remaining useful life of a physical component by reducing a workload of the physical component. For example, reconfiguring module 110 may reconfigure a fan to run at a slower speed or may reconfigure a power supply to draw less current.

In some examples, a failing physical component may perform the same function as a non-failing physical component in the same device. In these situations, reconfiguring module 110 may prolong the remaining useful life of the failing physical component by reducing the workload of the failing physical component and by increasing the workload of the non-failing physical component. For example, reconfiguring module 110 may reconfigure a set of fans that includes a failing fan by decreasing the speed of the failing fan and by increasing the speeds of the other fans in the set of fans to compensate for the decrease in the speed of the failing fan.

In some examples, reconfiguring module 110 may reconfigure a non-failing physical component of a device so that the remaining useful life of a failing physical component in the same device is prolonged. For example in some situations, the remaining useful life of a physical component (e.g., a microcontroller) may be quickly reduced when the physical component experiences certain conditions (e.g., high temperatures). In situations such as this, reconfiguring module 110 may prolong the remaining useful life of a physical component by (1) identifying the condition that is reducing the remaining useful life of the physical component and by (2) reconfiguring a non-failing physical component to reduce or eliminate the condition. For example, reconfiguring module 110 may reconfigure fans within a device to run at a higher speed in order to reduce the temperature of a temperature-sensitive physical component of the device and prolong its remaining useful life.

In some examples, reconfiguring module 110 may automatically reconfigure a network when a remaining useful life of a physical component reaches a particular threshold. In at least one example, reconfiguring module 110 may enable an administrator to select how a network will be reconfigured before a remaining useful life of a physical component reaches a particular threshold. Additionally or alternatively, reconfiguring module 110 may notify an administrator of a network when the remaining useful life of a physical component has reached a predetermined threshold and/or may enable the administrator to choose how the network is reconfigured. Using FIG. 6 as an example, reconfiguring module 110 may present notification 600 to an administrator when an optical receiver is approaching the end of its remaining useful life.

In some examples as part of notifying an administrator, reconfiguring module 110 may propose a configuration of a network to the administrator that allows a failing physical component to be taken offline or fail without causing the network to become unavailable to any user of the network. For example, reconfiguring module 110 may propose a configuration that allows the administrator to perform a proactive maintenance operation on the physical component without causing the network to become unavailable to any user of the network. In some examples, reconfiguring module 110 may enable the administrator to apply the configuration to the network while the maintenance operation is performed on the physical component and/or to revert the network to a prior configuration after the maintenance operation has been performed.

In at least one example, reconfiguring module 110 may guide the administrator through a step-by-step process of determining the proper maintenance operation to perform on a failing physical component, configuring the network to perform the maintenance operation, performing the maintenance operation, and/or reverting the network to a prior configuration after the maintenance operation is performed. For example after detecting that an optical transceiver of a network switch is about to fail, reconfiguring module 110 may reroute traffic from paths that pass through the optical transceiver to secondary paths. After the traffic is rerouted, reconfiguring module 110 may instruct an administrator to replace the optical transceiver. Finally after the optical transceiver has been replaced, reconfiguring module 110 may revert the rerouted traffic back through the replacement optical transceiver.

In some examples, reconfiguring module 110 may enable an administrator to choose to immediately apply a configuration that changes how traffic flows through a network and/or how physical components in the network operate. For example, reconfiguring module 110 may enable an administrator to choose to immediately reroute a user's traffic through a secondary path through the network when the remaining useful life of a physical component has reached a particular threshold.

In some situations, an administrator may not wish to immediately reconfigure a network. In some examples, reconfiguring module 110 may enable an administrator to monitor the health of a physical component when the remaining useful life of the component reaches a particular threshold. In one example, reconfiguring module 110 may enable an administrator to monitor the health of a physical component by periodically presenting the administrator with a health report that enables the administrator to see how various health indicators of the physical component are changing overtime. Using FIG. 7 as an example, reconfiguring module 110 may present notification 700 to an administrator when an optical receiver is approaching the end of its remaining useful life. As shown in FIG. 7, notification 700 includes information about various health indicators and how they have changed over time.

In some examples, reconfiguring module 110 may enable an administrator to choose a time period after which a network may be reconfigured. For example, reconfiguring module 110 may enable the administrator to indicate a time period after which a user's traffic will be automatically switched over to a pre-defined link. In some examples, reconfiguring module 110 may enable an administrator to select to reconfigure a network in response to the actual failure of a physical component. For example, reconfiguring module 110 may enable an administrator to select a configuration for a network that causes a user's traffic to failover from a path through the network that is affected by the failure of a physical component to another path through the network that is not affected by the failure of the physical component. In some examples, reconfiguring module 110 may enable an administrator to select to reconfigure a network in response to a remaining useful life and/or a health indicator of a physical component exceeding an additional threshold. For example, reconfiguring module 110 may enable an administrator to select to reconfigure a network in response to a remaining useful life and/or health indicator of a physical component changing more than a predetermined amount.

In some situations the remaining useful life of each physical component in a group of related physical components in a network may simultaneously reach a predetermined threshold. In these situations, reconfiguring module 110 may reconfigure the network so that failure of the group of related physical components does not cause the network to become unavailable to any user of the network. Additionally or alternatively, reconfiguring module 110 may notify an administrator of the network or a manufacture of the group of related physical components or the devices in which they exist when the remaining useful life of each physical component in the group of related physical components simultaneously reach the predetermined threshold. In some examples, reconfiguring module 110 may enable the administrator or manufacture to choose or suggest how the network should be reconfigured so that failure of the group of related physical components does not cause the network to become unavailable to any user of the network.

In some examples, reconfiguring module 110 may transmit notifications and/or reconfigure a network as part of SNMP agents installed on each device in the network. Additionally or alternatively, reconfiguring module 110 may reconfigure a network as part of a SNMP manager that monitors, collects, and/or exchanges network management information with SNMP agents running on each device in the network. In some examples, reconfiguring module 110 may use a management information base (MIB) object that represents a physical component to collect and/or access information about remaining-useful-life thresholds, notifications, and/or network configurations.

As explained above, by determining when a physical component (e.g., an optical transceiver, a fan, or a power supply) of a network device (e.g., a switch or router) is likely to fail, embodiments of the instant disclosure may enable an administrator of a network to proactively reconfigure the network in anticipation of the failure of the physical component, which may reduce unscheduled downtime and improve the availability of the network. For example in anticipation of the failure of a physical component of a device in a network, embodiments of the instant disclosure may enable an administrator of the network to perform proactive maintenance operations on the physical component and/or reconfigure the network in a way that prevents the failure of the physical component from negatively impacting users of the network. In one example, embodiments of the instant disclosure may, in response to detecting the eminent failure of a physical component of a network switch that hosts a user's primary path through a network, reconfigure the network such that the user's traffic is routed through a secondary path through the network before or when the physical component actually fails.

Figure 8:
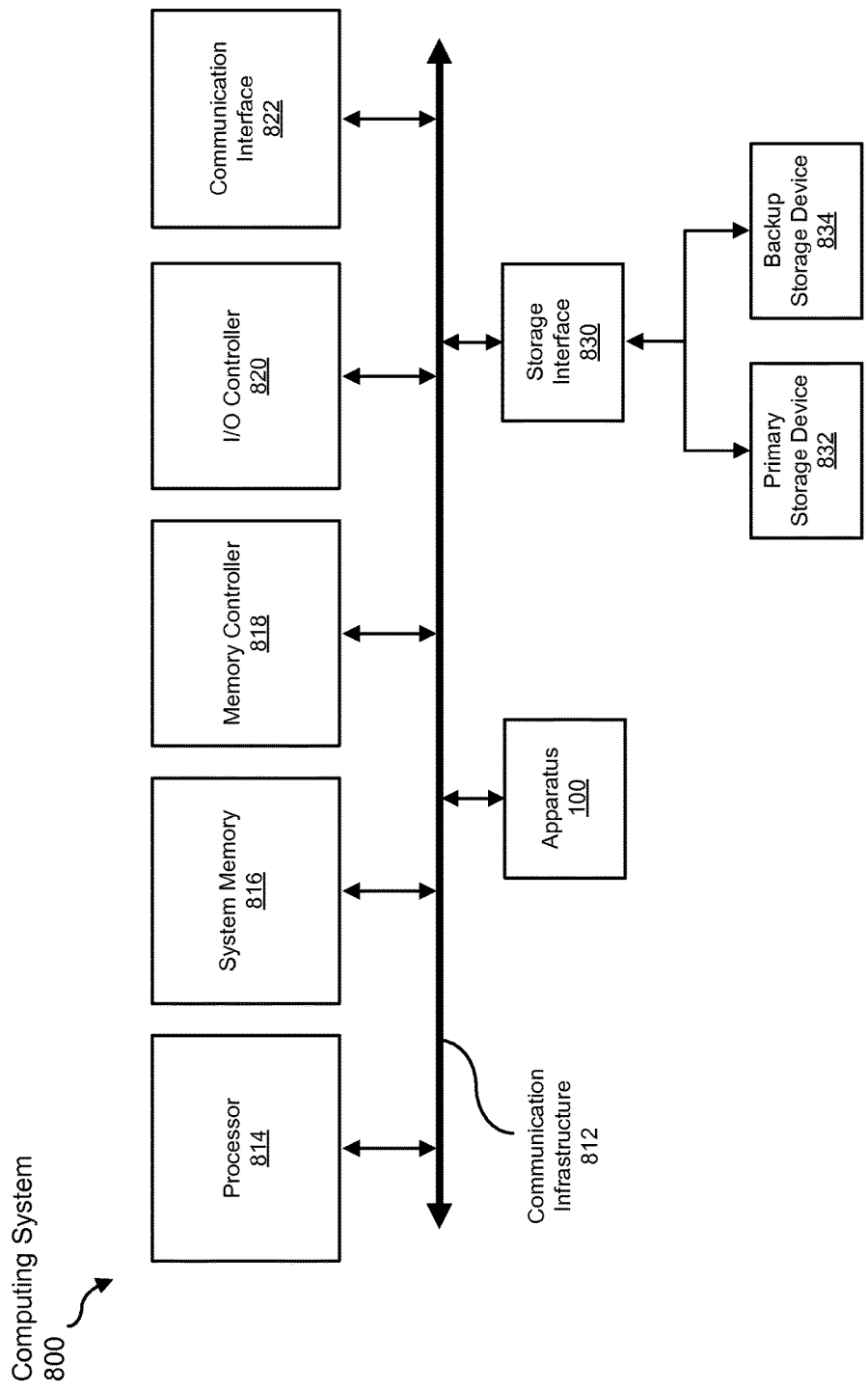
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a health indicator of a physical component of a network device in a network to be transformed, transform the health indicator into a estimation of the remaining useful life of the physical component, output a result of the transformation to a system that manages hardware failures within the network by reconfiguring the network, use the result of the transformation to reconfigure the network, and store the result of the transformation to a storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a health-indicator sensor, at least one health indicator of a physical component of a device in a network;
   using the health indicator received from the health-indicator sensor to estimate a remaining useful life of the physical component;
   detecting that the remaining useful life of the physical component has reached a predetermined threshold;
   reconfiguring, while the physical component is operating within the network and in response to detecting that the remaining useful life of the physical component has reached the predetermined threshold, the network by performing at least one of:
     reconfiguring an additional physical component in the network so that failure of the physical component does not cause the network to become unavailable to any user of the network;
     reconfiguring the physical component so that:
       workload of the physical component is reduced; and
       workload of the additional physical component is increased, wherein the step of reconfiguring the network is performed by a computing device comprising at least one processor.

2. The method of claim 1, wherein reconfiguring the network further comprises:
   determining a configuration of the network that allows the physical component to fail without causing the network to become unavailable to any user of the network;
   proposing the configuration to an administrator of the network.

3. The method of claim 1, wherein:
   reconfiguring the network further comprises determining a configuration of the network that allows a maintenance operation to be performed on the physical component without causing the network to become unavailable to any user of the network;
   reconfiguring the additional physical component comprises applying the configuration to the network while the maintenance operation is performed on the physical component.

4. The method of claim 1, wherein:
   failure of the physical component causes a user's primary path through the network to become unavailable;
   reconfiguring the additional physical component comprises reconfiguring the additional physical component such that the user's traffic is rerouted to a secondary path through the network in response to expiration of a predetermined time period.

5. The method of claim 1, wherein:
   failure of the physical component causes a user's primary path through the network to become unavailable;
   reconfiguring the additional physical component comprises reconfiguring the additional physical component such that the user's traffic is rerouted to a secondary path through the network in response to failure of the physical component.

6. The method of claim 1, wherein:
   the device is a network switch;
   failure of the physical component causes the network to become unavailable to a user connected to the network through a port of the network switch;
   reconfiguring the additional physical component comprises rerouting the user's traffic through an additional port of the network switch in response to at least one of:
     expiration of a predetermined time period;
     failure of the physical component.

7. The method of claim 1, wherein:
   the device is a network switch;
   failure of the physical component causes the network to become unavailable to a user connected to the network through the network switch;
   reconfiguring the additional physical component comprises rerouting the user's traffic through an additional network switch in response to at least one of:
     expiration of a predetermined time period;
     failure of the physical component.

8. The method of claim 1, wherein:
   failure of the physical component causes a user's primary path through the network to become unavailable;
   detecting that the remaining useful life of the physical component has reached the predetermined threshold comprises detecting, while periodically monitoring the remaining useful life of the physical component, that a rate of change in the remaining useful life of the physical component exceeds an additional predetermined threshold;
   reconfiguring the additional physical component comprises reconfiguring the additional physical component such that the user's traffic is rerouted to a secondary path through the network in response to detecting that the remaining useful life of the physical component exceeds the additional predetermined threshold.

9. The method of claim 1, wherein:
   the device comprises a redundant physical component;
   reconfiguring the additional physical component comprises causing the device to use the redundant physical component in place of the physical component.

10. The method of claim 1, wherein reconfiguring the network comprises reconfiguring the network so that the remaining useful life of the physical component is prolonged.

11. The method of claim 1, wherein reconfiguring the additional physical component comprises reconfiguring the additional physical component such that the workload of the physical component is reduced.

12. The method of claim 1, wherein reconfiguring the additional physical component comprises reconfiguring the additional physical component of the device so that the remaining useful life of the physical component is prolonged.

13. The method of claim 1, wherein:
the physical component and the additional physical component perform a function;
reconfiguring the additional physical component comprises reconfiguring the additional component to perform more of the function;
reconfiguring the physical component comprises reconfiguring the physical component to perform less of the function.

14. The method of claim 1, wherein:
receiving the health indicator of the physical component comprises receiving a first health indicator of the physical component and a second health indicator of the physical component;
using the health indicator to estimate the remaining useful life of the physical component comprises using the first health indicator and the second health indicator to estimate the remaining useful life of the physical component.

15. The method of claim 1, wherein:
receiving the health indicator of the physical component comprises receiving a health indicator of a group of related physical components;
using the health indicator to estimate the remaining useful life of the physical component comprises using the health indicator of the group of related physical components to estimate the remaining useful life of the physical component.

16. The method of claim 1, wherein:
detecting that the remaining useful life of the physical component has reached the predetermined threshold comprises detecting that a remaining useful life of each physical component in a group of related physical components has simultaneously reached the predetermined threshold;
reconfiguring the additional physical component so that failure of the physical component does not cause the network to become unavailable to any user of the network comprises reconfiguring, in response to detecting that the remaining useful life of each physical component in the group of related physical components has simultaneously reached the predetermined threshold, the additional physical component so that failure of the group of related physical components does not cause the network to become unavailable to any user of the network.

17. The method of claim 1, further comprising:
detecting, after the network is reconfigured in response to detecting that the remaining useful life of the physical component has reached the predetermined threshold, that the remaining useful life of the physical component has reached an additional predetermined threshold;
reconfiguring the network in response to detecting that the remaining useful life of the physical component has reached the additional predetermined threshold.

18. The method of claim 1, wherein:
the device is a network switch;
the physical component comprises at least one of:
an optical transceiver;
a fan;
an air filter;
a battery;
a hard disk drive;
a solid state drive;
a hybrid memory cube;
static random access memory;
dynamic random access memory;
electrically erasable programmable read-only memory;
flash memory;
a relay;
a switch;
an electrolytic capacitor;
a power field-effect transistor;
a power supply;
a power converter;
a microprocessor;
a microcontroller;
an application-specific integrated circuit.

19. A system comprising:
a monitoring module, stored in memory, that receives, from a health-indicator sensor, at least one health indicator of a physical component of a device in a network;
an estimating module, stored in memory, that uses the health indicator to estimate a remaining useful life of the physical component;
a detecting module, stored in memory, that detects that the remaining useful life of the physical component has reached a predetermined threshold;
a reconfiguring module, stored in memory, that reconfigures, while the physical component is operating within the network, the network by performing at least one of:
reconfiguring an additional physical component in the network so that failure of the physical component does not cause the network to become unavailable to any user of the network;
reconfiguring the physical component so that:
workload of the physical component is reduced; and
workload of the additional physical component is increased;
at least one physical processor that executes the monitoring module, the estimating module, the detecting module, and the reconfiguring module.

20. A non-transitory computer-readable medium comprising one or more computer-executable instructions that, when executed by at least one processor of at least one network device, cause the network device to:
receive, from a health-indicator sensor, at least one health indicator of a physical component of a device in a network;
use the health indicator received from the health-indicator sensor to estimate a remaining useful life of the physical component;
detect that the remaining useful life of the physical component has reached a predetermined threshold;
reconfigure, while the physical component is operating within the network and in response to detecting that the remaining useful life of the physical component has reached the predetermined threshold, the network by performing at least one of:
reconfiguring an additional physical component in the network so that failure of the physical component does not cause the network to become unavailable to any user of the network;
reconfiguring the physical component so that:
workload of the physical component is reduced; and
workload of the additional physical component is increased.

* * * * *